(12) United States Patent
Uluyol (10) Patent No.: US 8,805,624 B2
(45) Date of Patent: Aug. 12, 2014

(54) METHOD AND SYSTEM FOR CHARACTERIZING WEAR DAMAGE ON A ROLLING-ELEMENT BEARING

(75) Inventor: Onder Uluyol, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1067 days.

(21) Appl. No.: 12/690,631

(22) Filed: Jan. 20, 2010

(65) Prior Publication Data

US 2011/0178724 A1 Jul. 21, 2011

(51) Int. Cl.
*G01B 3/44* (2006.01)

(52) U.S. Cl.
USPC .......................................................... 702/34

(58) Field of Classification Search
None
See application file for complete search history.

(56) References Cited

U.S. PATENT DOCUMENTS

| | | | | |
|---|---|---|---|---|
| 5,852,793 | A | * | 12/1998 | Board et al. ................... 702/56 |
| 6,651,012 | B1 | * | 11/2003 | Bechhoefer ..................... 702/34 |
| 7,559,240 | B2 | | 7/2009 | Iwatsubo et al. |
| 2005/0246150 | A1 | | 11/2005 | Shiromaru et al. |

FOREIGN PATENT DOCUMENTS

| | | |
|---|---|---|
| DE | 102005023205 A1 | 11/2006 |
| EP | 0114432 A2 | 8/1984 |
| EP | 0114432 A3 | 8/1984 |
| GB | 1601703 | 11/1981 |
| GB | 2269638 A | 2/1994 |

OTHER PUBLICATIONS

EP Search Report, EP 10186771.1-1236 dated Jun. 8, 2011.
EP Communication, EP 10186771.1-1236 dated Jun. 28, 2011.

* cited by examiner

*Primary Examiner* — Aditya Bhat
(74) *Attorney, Agent, or Firm* — Ingrassia Fisher & Lorenz, P.C.

(57) ABSTRACT

Methods and systems for characterizing and estimating the wear damage of a rolling-element bearing are provided. At least one geometric attribute, such as the length, of a damage feature (e.g., a spall cavity) on the rolling-element bearing is calculated based on a geometry of the rolling-element bearing. An accumulated mass of damage particles ejected from the rolling-element bearing during operation of the rolling-element bearing is determined. When the accumulated mass of the damage particles exceeds a predetermined threshold, an indication or a signal is generated. The predetermined threshold of the accumulated mass is based on the at least one geometric attribute of the damage feature. The calculation of the at least one geometric attribute may be based on, for example, a depth of the damage feature, a radius of the rolling elements in the bearing, a radius of an outer race of the bearing as measured from an inner surface thereof, and the number of rolling elements in the bearing.

14 Claims, 6 Drawing Sheets

METHOD AND SYSTEM FOR CHARACTERIZING WEAR DAMAGE ON A ROLLING-ELEMENT BEARING

GOVERNMENT RIGHTS

This invention was made with Government support under Contract Bell OSST 6.3 (P0 301287-33) awarded by the Aviation Applied Technology Directorate (AATD). The Government has certain rights in this invention.

TECHNICAL FIELD

The present invention generally relates to rolling-element bearings, and more particularly relates to a method and system for characterizing wear damage on a rolling-element bearing.

BACKGROUND

Rolling-element bearings, such as ball bearings, are used in a wide variety of mechanical and electro-mechanical systems, such as the turbine engines in aircraft. Fatigue wear in rolling-element bearings is a relatively nonlinear phenomenon. Thus, estimating the severity of fatigue wear is difficult, as is providing a robust monitoring service for bearing health and the associated engine maintenance action.

Accordingly, it is desirable to provide an improved method and system for characterizing and/or estimating wear damage on a rolling-element bearing. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment, a method for estimating wear damage of a rolling-element bearing is provided. At least one geometric attribute of a damage feature on the rolling-element bearing is calculated based on a geometry of the rolling-element bearing. An accumulated mass of damage particles ejected from the rolling-element bearing during operation of the rolling-element bearing is determined. An indication is generated when the accumulated mass of the damage particles exceeds a predetermined threshold. The predetermined threshold of the accumulated mass is based on the at least one geometric attribute of the damage feature.

In another embodiment, a method for estimating wear damage of a rolling-element bearing is provided. The rolling-element bearing has an inner race, an outer race, and a plurality of rolling elements between the inner and outer races. A first length of a spall cavity on the rolling-element bearing is calculated based on a geometry of the rolling-element bearing. The first length corresponds to a first relationship between the spall cavity and the plurality of rolling elements. A second length of the spall cavity on the rolling-element bearing is calculated based on the geometry of the rolling-element bearing. The second length corresponds to a second relationship between the spall cavity and the plurality of rolling elements. An accumulated mass of spall particles ejected from the rolling-element bearing during operation of the rolling-element bearing is determined. A first indication is generated when the accumulated mass of the spall particles exceeds a first predetermined threshold. The first predetermined threshold is based on the first length of the spall cavity. A second indication is generated when the accumulated mass of the spall particles exceeds a second predetermined threshold. The second predetermined threshold is based on the second length of the spall cavity.

In a further embodiment, a system for estimating wear damage of a rolling-element bearing is provided. The system includes a debris sensor configured to generate a debris signal representative of a size of debris particles passing through a fluid passageway and a computing system in operable communication with the debris sensor. The computing system is configured to determine an accumulated mass of the debris particles passing through the fluid passageway based on the debris signal and generating an indication when the accumulated mass of the debris particles exceeds a predetermined threshold. The predetermined threshold of the accumulated mass is based on at least one geometric attribute of a damage feature on the rolling-element bearing. The at least one geometric attribute of the damage feature is based on a geometry of the rolling-element bearing.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-9 are merely illustrative and may not be drawn to scale.

In accordance with various aspects of the present invention, improved systems and methods for characterizing or estimating wear damage on a rolling-element bearing are provided. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, such as memory elements, digital signal processing elements, look-up tables, databases, and the like, which may carry out a variety of functions, some using continuous, real-time computing, under the control of one or more microprocessors or other control devices. Such general techniques and components that are known to those skilled in the art are not described in detail herein.

FIG. 1 to FIG. 9 illustrates methods and systems for characterizing and estimating the wear damage of a rolling-element bearing. At least one geometric attribute, such as the length, of a damage feature (e.g., a spall cavity) on the rolling-element bearing is calculated based on a geometry of the rolling-element bearing. An accumulated mass of damage particles ejected from the rolling-element bearing during operation of the rolling-element bearing is determined. When the accumulated mass of the damage particles exceeds a predetermined threshold, an indication or a signal is generated. The predetermined threshold of the accumulated mass is based on the at least one geometric attribute of the damage feature. The calculation of the at least one geometric attribute may be based on, for example, a depth of the damage feature, a radius of the rolling elements in the bearing, a radius of an outer race of the bearing as measured from an inner surface thereof, and the number of rolling elements in the bearing.

Figure 1:
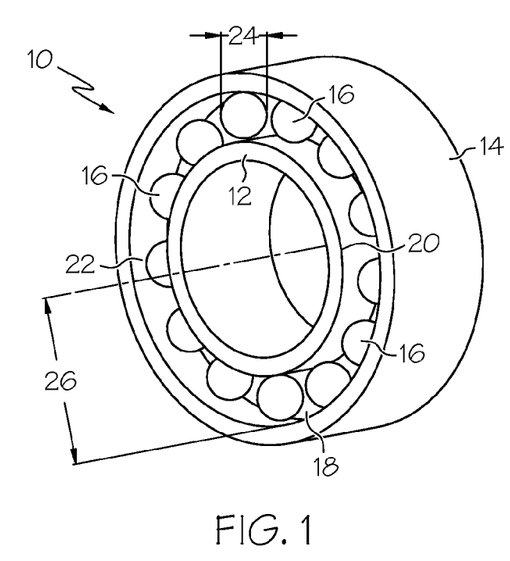
FIG. 1 is an isometric view of a rolling-element bearing according to one embodiment of the present invention.

FIG. 1 illustrates a rolling-element bearing 10, according to one embodiment of the present invention. In the depicted embodiment, the bearing 10 is a ball bearing and includes an inner race 12, and outer race 14, and a plurality of balls (or rolling elements) 16. As shown, the inner and outer races 12 and 14 are substantially circular, annular rings. The inner race 12 is centered within the opening extending through the outer race 14 and is sized relative to the outer race 14 such that a gap 18 lies between an outer surface 20 of the inner race 12 and an inner surface 22 of the outer race 14. As shown, the balls 16 are fit in the gap 18 and sized to make contact with both the outer surface 20 of the inner race 12 and the inner surface 22 of the outer race 14. The balls 16 have a radius 24 of, for example, between 1 millimeter (mm) and 5 centimeters (cm). The bearing 10 has a pitch radius 26, as measured between a center of the bearing 10 and the inner surface 22 of the outer race 14, of between 5 mm and 1 meter (m), as an example. As will be appreciated by one skilled in the art, the rolling-element bearing 10 may be installed in various mechanical systems, such as a turbine engine of an aircraft or any other actuator.

Figure 2:
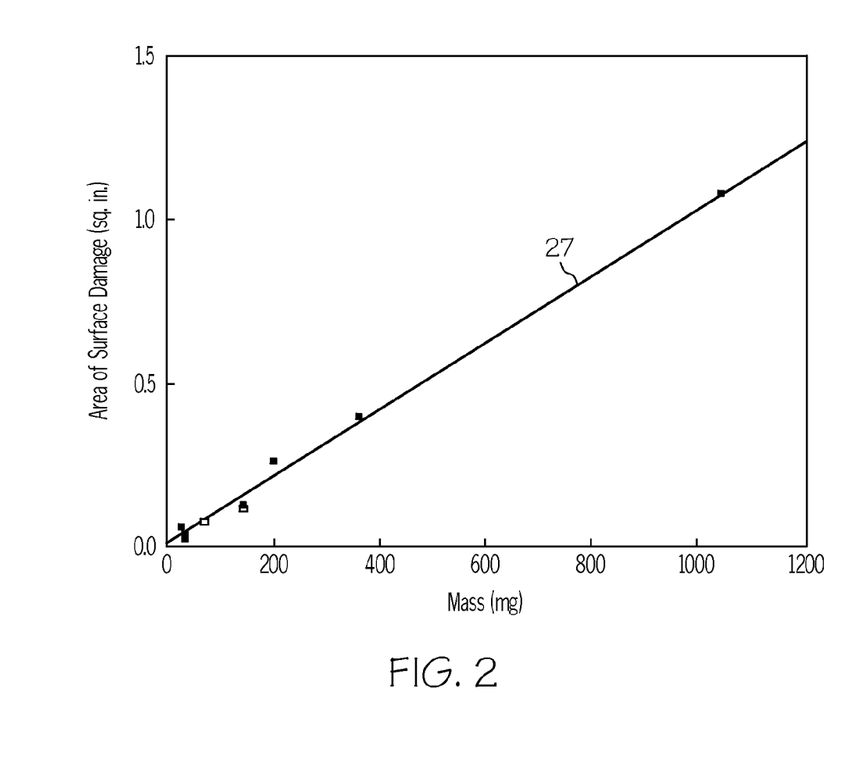
FIG. 2 is a graph illustrating the relationship between the accumulated mass of debris ejected from a bearing during operation and the surface area of the damaged portions of the bearing.

According to one aspect of the present invention, the relationship between the surface area of the damaged (i.e., worn) portions of the bearing 10 and the total mass of the damage particles (e.g., spalls) that are ejected from the bearing during use is utilized to characterize, or estimate, the wear damage of the bearing. FIG. 2 graphically illustrates such a relationship with line 27. As indicated by the linear nature of line 27, the surface area (e.g., in square inches) of the damaged portions (i.e., the vertical axis of FIG. 2) of the bearing is relatively directly proportional to the total accumulated mass (e.g., iron) of the ejected particles (i.e., the horizontal axis of FIG. 2). Such a relationship indicates that after an initial damage feature (e.g., a spall) size, the depth of the damage feature remains constant. Additionally, because of the design of many rolling-element bearings, the widths of the damage features, such as spalls or spall cavities, formed on bearings may be considered to be related to bearing geometry or spall length. As such, the accumulated mass of debris may be directly proportional to the length of the damage features, and vice versa. In other words, as will be described below, the accumulated mass may be used to determine the length of the damage features on the bearing.

In one embodiment, an initial spall depth ($p_{init}$) of 75 micrometers (μm) is assumed, as is a maximum spall depth ($p_{max}$) of 150 μm. Setting the depth of the spall as such simplifies the estimation of the wear damage into solving for a two-dimensional area. Embodiments of the present invention utilize bearing geometry to set thresholds (or Damage Milestones (DMs)) as indicators of the severity of the surface wear. The Damage Milestones quantify the severity in terms of rolling element (ball or roller) size for a given bearing. Table 1 lists the definitions of a set of three such Damage Milestones (DM1, DM2, and DM3), according to one embodiment of the present invention, along with the bearing geometry parameters used in calculations of the Damage Milestones.

TABLE 1

Bearing Damage Milestone Definitions

| Damage Milestone | Spall Length | Spall Width | Spall Depth |
|---|---|---|---|
| DM1: One ball fits in initial spall depth | Compute using bearing geometry | Proportional to ball radius & spall length | 75 micron |
| DM2: Ball makes 60 deg rotation | Compute using bearing geometry | Proportional to race width and spall length | 150 micron |
| DM3: Two adjacent balls fit in spall | Compute using bearing geometry | Proportional to race width | 150 micron |

Figure 3:
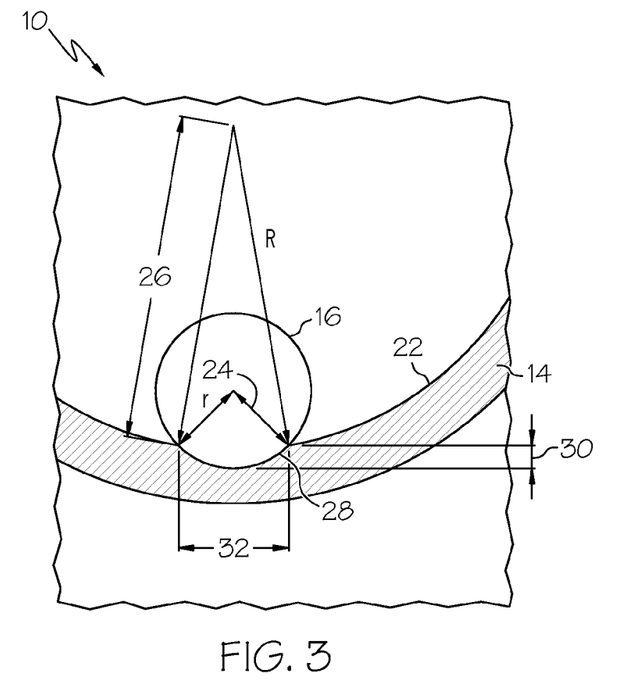
FIGS. 3-5 are cross-sectional views of a portion of the bearing of FIG. 1.
Figure 4:
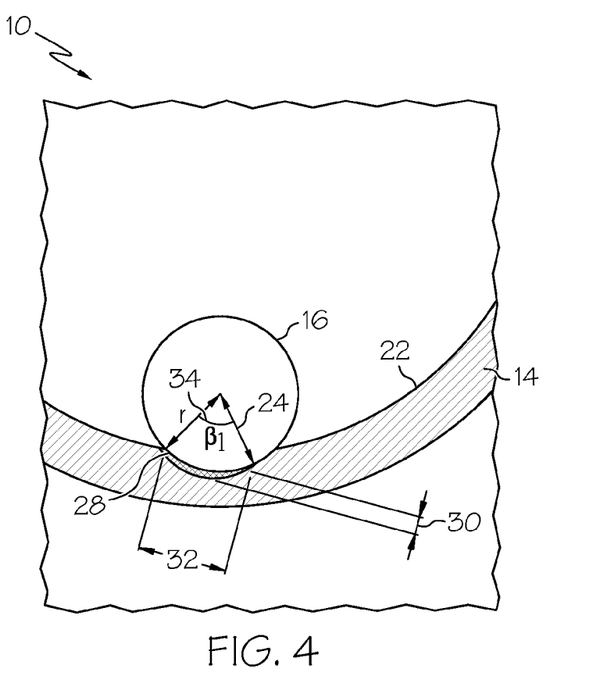
Figure 5:
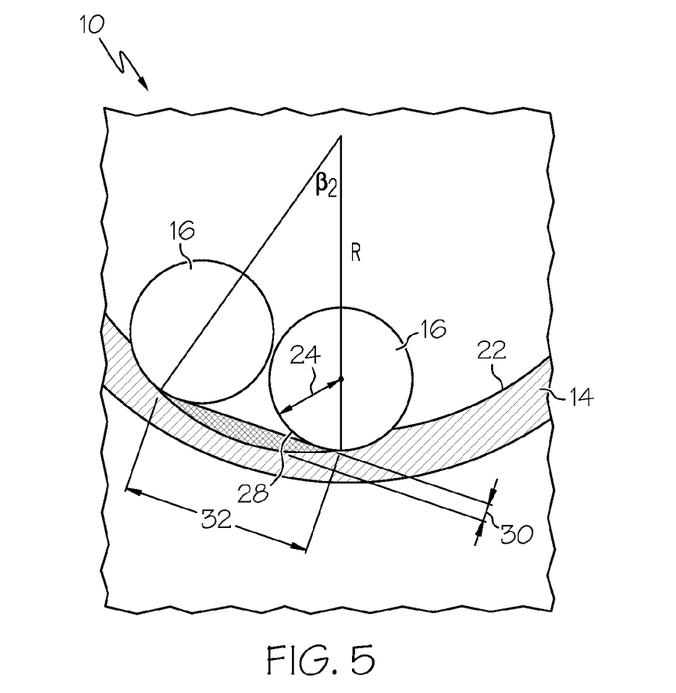

FIGS. 3, 4, and 5 are cross-sectional illustrations of the rolling-element bearing 10 showing various sizes of a spall 28 formed on the inner surface 22 of the outer race 14, in accordance with the Damage Milestones described in Table 1. FIG. 3 illustrates the spall 28 according to DM1. As described above, the depth 30 of the spall 28 is initially assumed to be 75 μm. The size of the spall 28 is determined by the portion of the ball 16 that can fit into the spall 28. As such, the length of the spall ($s_1$) 32 may be expressed $$s_1 = 2\sqrt{2rp - p^2} \text{ and } w_1 \propto (r, s_1), \qquad (1)$$

where r is the radius of the ball(s) 24, p is the depth 30 of the spall 28, and $w_1$ is the width (not shown) of the spall 28. As indicated, the width of the spall ($w_1$) is proportional to the radius 24 of the ball 16 and the length 32 of the spall 28. That is, at DM1, the width of the spall 28 may be estimated as ⅔ of the radius 24 of the ball 16 or ½ of the length 32 of the spall 28, whichever is smaller.

FIG. 4 illustrates the spall 28 according to DM2. As described above, the depth 30 of the spall 28 is assumed to be 150 μm. The size of the spall 28 in FIG. 4 corresponds to an area covered by the ball 16 during a rotation of an angle ($\beta_1$) 34 of 60 degrees. As such, the length of the spall ($s_2$) 32 at DM2 may be expressed $$s_2 = \pi r/3 \text{ and } w_2 \propto (w_{OR}, s_2), \qquad (2)$$

where r is the radius of the ball(s) 24 and $w_2$ is the width (not shown) of the spall 28. As indicated, the width of the spall ($w_2$) is proportional to a width of the outer race ($W_{OR}$) and the length 32 of the spall 28 ($s_2$). The width may be estimated as the minimum of ⅓ of the width of the outer race ($w_{OR}$) and ⅔ of the length 32 of the spall 28 ($s_2$).

FIG. 5 illustrates the spall 28 according to DM3. As described above, the depth 30 of the spall 28 is assumed to be 150 μm. The size of the spall 28 in FIG. 5 corresponds to a spall large enough to include two of the balls 16. As such, the length of the spall ($s_3$) 32 at DM3 may be expressed $$s_3 = 2\left(\frac{\pi R}{N} + r\right) \text{ and } w_3 \propto (w_{OR}),\quad(3)$$

where r is the radius 24 of the ball(s) 16, R is the pitch radius 26 of the bearing 10, N is the total number of balls (or other rolling elements) 16 in the bearing 10, and $w_3$ is the width (not shown) of the spall 28. As indicated, the width of the spall ($w_3$) is proportional (~⅓) to a width of the outer race ($w_{OR}$).

As described above, because of the assumptions made about the width and depth of the spalls, the volume (and/or mass) of the spalls at the Damage Milestones may then be calculated, or vice versa. In one embodiment, the spall length may be determined from the accumulated mass using the accumulated mass and the equations described above.

Figure 6:
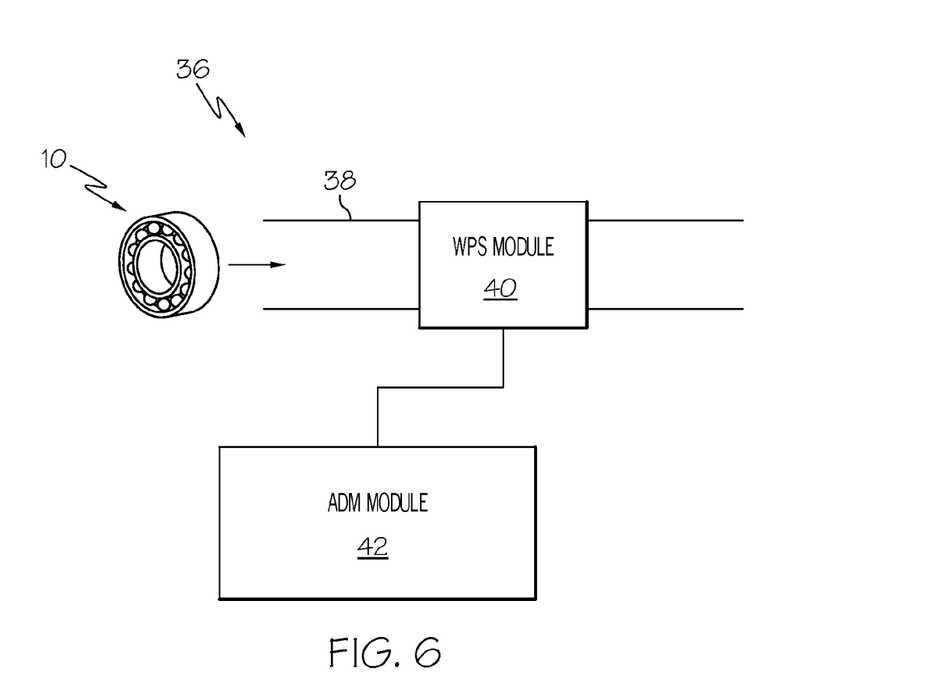
FIG. 6 is a schematic view of a system for characterizing bearing wear damage according to one embodiment of the present invention.

FIG. 6 schematically illustrates a rolling-element bearing system 36, according to one embodiment of the present invention. The system 36 includes the rolling-element bearing 10, a fluid passageway 38, a Wear Particle Sensing (WPS) module 40, and an Analytical Damage Mapping (ADM) module (or a computing system) 42. As mentioned above, the rolling-element bearing 10 may installed in larger mechanical system, such as a jet turbine engine. As is commonly understood, during operation, the bearing 10 is provided with or immersed in a lubricating fluid through a series of channels, such as the fluid passageway (or mainline) 38. As shown the fluid passageway interconnects the bearing 10 and the WPS module 40.

The WPS module 40 is configured to detect damage or wear particles ejected from the bearing 10 during operation and introduced into passageway 38. In one embodiment, the passage of ferromagnetic debris through the module 40 causes disturbances creating an input signal that indicates the debris size. The disturbance created may be, for example, electrical, magnetic, optical, acoustic, or a combination thereof. The WPS module 40 tracks the total amount of accumulated particle debris mass over time.

The module 40 may be implemented using an inline or an online detection technique. In an inline detection approach, a sensing device with debris detection capability is mounted in the mainline of the lubricant flow as shown in FIG. 6. In an online detection embodiment (not shown), the particle sensing device is mounted such that the fluid only periodically passes therethrough (e.g., using one or more valves). In such an embodiment, WPS module may project the accumulated debris mass based on the amount of particles sensed in the analyzed sample lubricant and the associated flow rate.

Figure 7:
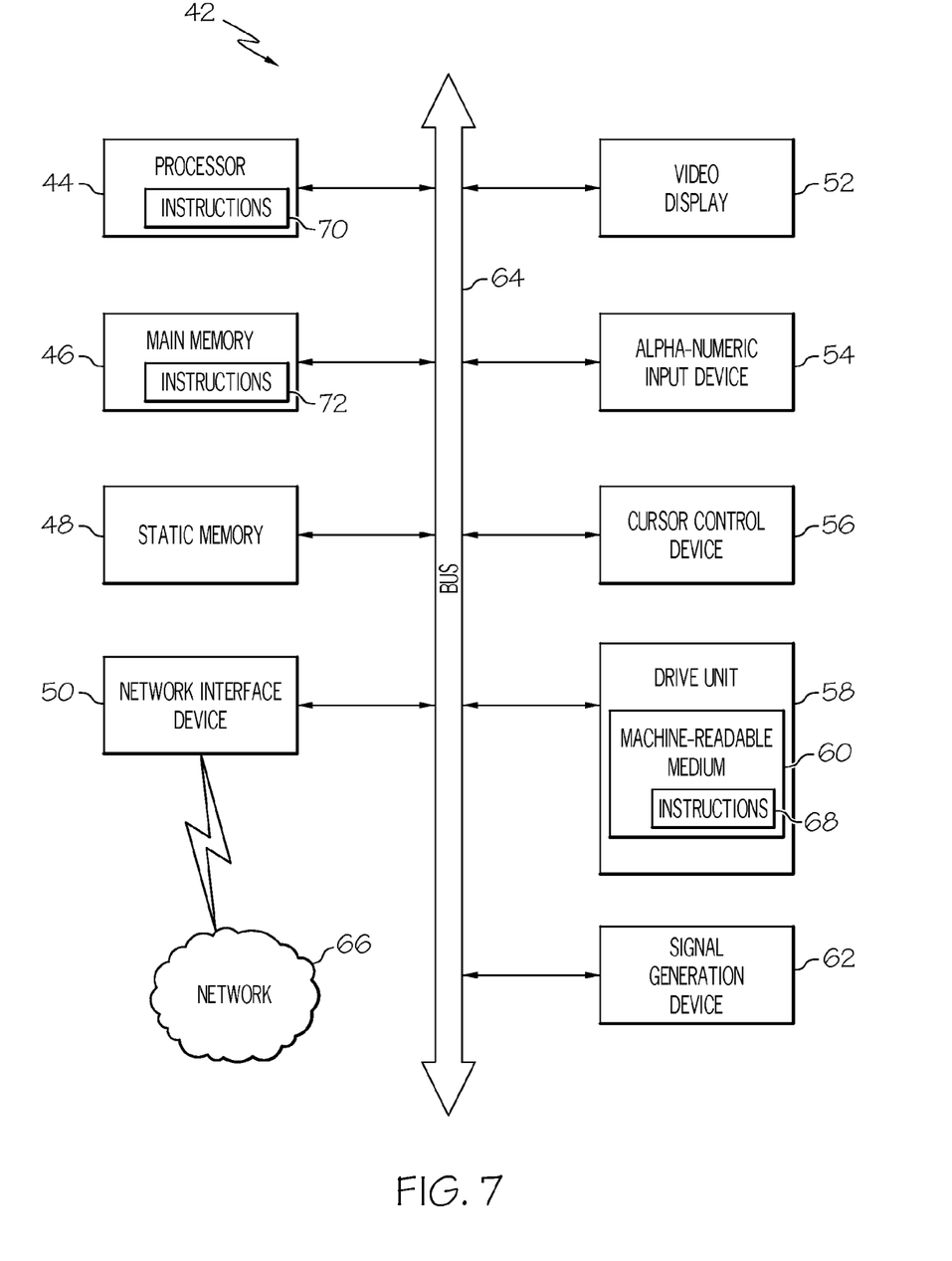
FIG. 7 is a block diagram of a computing sub-system within the system of FIG. 6.

The ADM module 42 is in operable communication with the WPS module 40. FIG. 7 schematically illustrates the ADM module (or a computing system) 42, according to one embodiment of the present invention. The computing system 42 includes a processor 44, a main memory 46, a static memory 48, a network interface device 50, a video display 52, an alpha-numeric input device 54, a cursor control device 56, a drive unit 58 including a machine-readable medium 60, and a signal generation device 62. All of the components of the computing system 42 are interconnected by a bus 64. The computing system 42 may be connected to a network 66 through the network interface device 50.

The processor 44 may be any one of numerous known general-purpose microprocessors or an application specific processor that operates in response to program instructions. The processor 44 may be implemented using a plurality of digital controls, including field programmable gate arrays (FPGAs), application specific integrated circuits (ASICs), discrete logic, microprocessors, microcontrollers, and digital signal processors (DSPs), or combinations thereof.

The machine-readable medium 60 includes a set of instructions 68, which may be partially transferred to the processor 44 and the main memory 46 through the bus 64. The processor 44 and the main memory 46 may also have separate internal sets of instructions 70 and 72 stored thereon. The various sets of instructions 68, 70, and 72 may include instructions that cause the processor 44 to perform the method(s) described herein. The main memory 46, static memory 48, the machine-readable medium 60, and/or the instructions 70 and 72 may include random access memory (RAM) and read-only memory (ROM), which may include the various information described above related to the particular bearing in use. It will be appreciated that this is merely exemplary of one scheme for storing operating system software and software routines, and that various other storage schemes may be implemented.

The video display (or display device) 52 may be, for example, a liquid crystal display (LCD) device or a cathode ray tube (CRT) monitor. The alpha-numeric input device 54 may be a keyboard and the cursor control device 56 may be a mouse, as commonly understood. The signal generation device 62 may be any device suitable for generating a signal (e.g., visual, audio, textual, etc.) to alert a user of a condition of the bearing with respect to the Damage Milestones described above.

Figure 8:
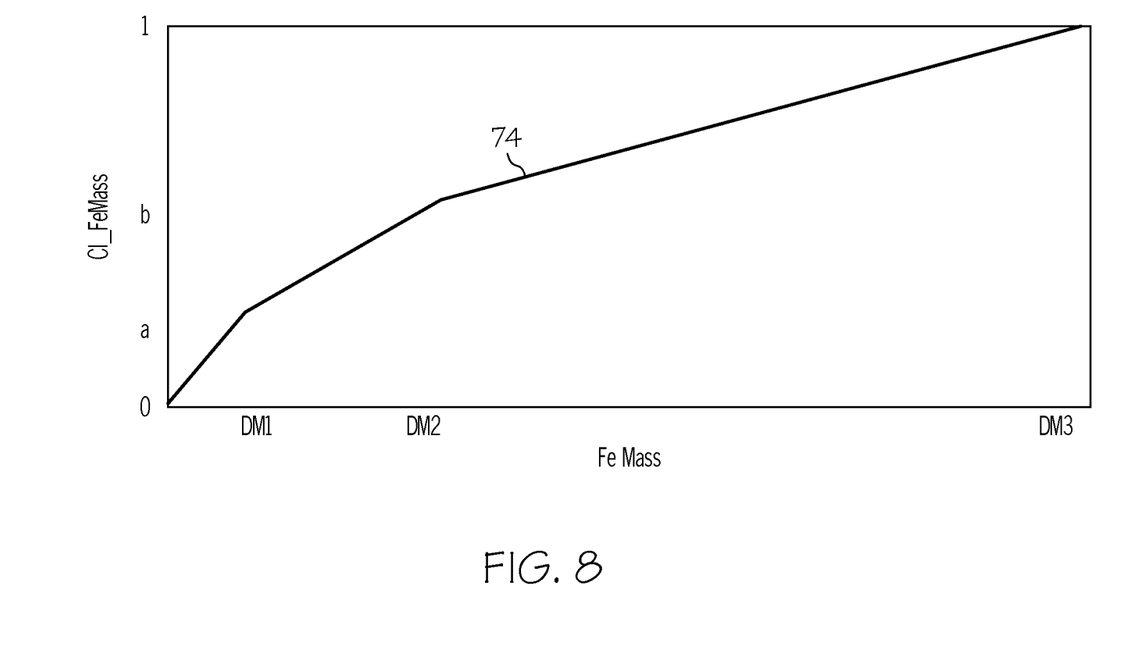
FIG. 8 is a graph illustrating the relationship between the accumulated mass of debris ejected from a bearing during operation and a wear condition indicator, according to one embodiment of the present invention.

In accordance with one aspect of the present invention, ADM Module 42 uses Damage Milestones (or other thresholds), such as those described above, to map the accumulated particle mass (e.g., iron (Fe) mass) detected by WPS module 40 to a Bearing Condition Indicator (CI) as shown in FIG. 8 with line 74. The map may be considered to be a piece-wise linear weighting of the accumulated mass (i.e., the horizontal axis) based on thresholds, such at DM1-DM3, described above. In one embodiment, the weighting accentuates, via a rapid increased in the CI (the vertical axis), an initial small rise in the accumulated mass while gradually scaling back the weighting as the accumulated mass increases. Thus, line 74 is broken into several, linear sections, with the slopes of the sections decreasing as the accumulated mass increases. The signal generation device 62 may be used to alert a user of the value or level of the CI and/or when the CI (and/or the accumulated mass and/or the length of the spall cavity) exceeds the thresholds associated with the DMs described above (or any other such thresholds).

One advantage is that the calculation of wear damage (or the CI) described above uses thresholds based upon actual, physical damage levels for a given bearing geometry, rather than arbitrary thresholds. As a result, early detection of surface wear is made possible, as relatively small amounts of wear debris may be accounted for.

Figure 9:
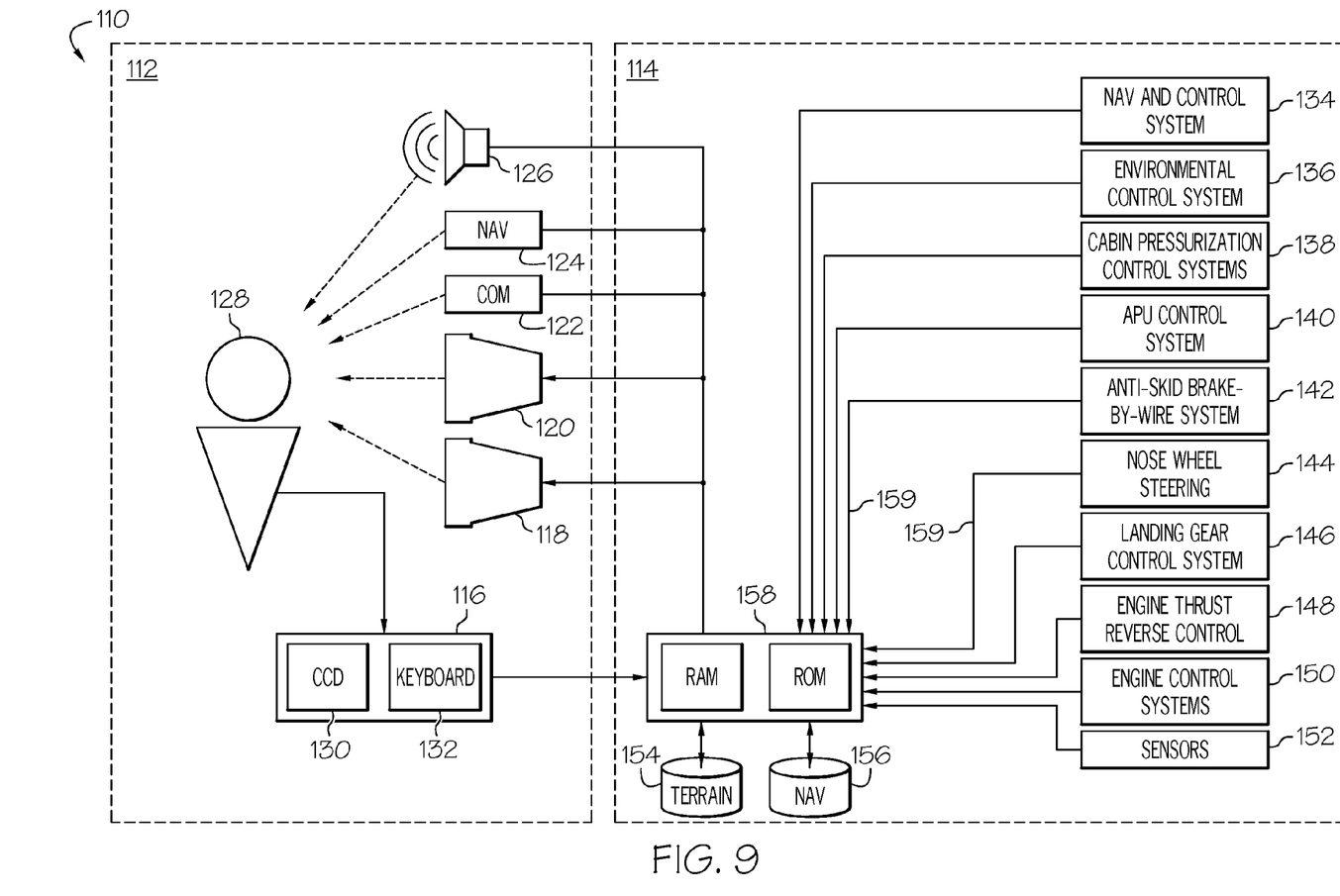
FIG. 9 is a block diagram of a vehicle in which the methods and systems of the present invention may be implemented, according to one embodiment.

FIG. 9 schematically illustrates a vehicle 110, such as an aircraft, in which the method and system described below may be implemented, according to one embodiment of the present invention. The vehicle 110 may be, in one embodiment, any one of a number of different types of aircraft such as, for example, a private propeller or jet engine driven airplane, a commercial jet liner, or a helicopter. In the depicted embodiment, the aircraft 110 includes a flight deck 112 (or cockpit) and an avionics/flight system 114. Although not specifically illustrated, it should be understood that the vehicle aircraft also includes a frame or body to which the flight deck 112 and the avionics/flight system 114 are connected, as is commonly understood.

As shown in FIG. 9, the flight deck 112 includes a user interface 116, display devices 118 and 120 (e.g., a display screen for a flight management system (FMS) and a primary flight display (PFD)), a communications radio 122, a navigational radio 124, and an audio device 126. The user interface 116 is configured to receive manual input from a user 128 (e.g., through a cursor control device 130 and a keyboard 132) and, in response to the user input, supply command signals to the avionics/flight system 114.

The avionics/flight system 114 includes a navigation and control system (or subsystem) 134, an environmental control system (ECS) 136, a cabin pressurization control system (CPCS) 138, an auxiliary power unit (APU) control system 140, an anti-skid brake-by-wire system 142, a nose wheel steering system 144, a landing gear control system 146, an engine thrust reverse control system 148, various other engine control systems 150 (which may at least partially include the bearing system 36 shown in FIG. 6), a plurality of sensors 152, one or more terrain databases 154, one or more navigation databases 156, and a processor 158. The various components of the avionics/flight system 114 are in operable communication via sensor inputs (e.g., analog sensor inputs) 159 (or a data or avionics bus).

Although not shown in detail, the navigation and control system 134 may include a flight management system (FMS), an inertial navigation system (INS), an autopilot or automated guidance system, multiple flight control surfaces (e.g., ailerons, elevators, and a rudder), an Air Data Computer (ADC), an altimeter, an Air Data System (ADS), a Global Positioning System (GPS) module, an automatic direction finder (ADF), a compass, at least one engine (in which the bearing 10 may be installed), and gear (i.e., landing gear).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for estimating wear damage of a rolling-element bearing comprising:
   calculating, using a processor, at least one geometric attribute of a damage feature on the rolling-element bearing based on a geometry of the rolling-element bearing;
   determining, using a processor, an accumulated mass of damage particles ejected from the rolling-element bearing during operation of the rolling-element bearing; and
   generating, using a processor, an indication when the accumulated mass of the damage particles exceeds a predetermined threshold, wherein the predetermined threshold of the accumulated mass is based on the at least one geometric attribute of the damage feature,
   wherein the rolling-element bearing comprises an inner race, an outer race, and a plurality of rolling elements between the inner and outer races, and
   wherein the at least one geometric attribute of the damage feature comprises a length of the damage feature as measured along a circumference of the outer race of the rolling-element bearing.

2. The method of claim 1, wherein the calculating of the at least one geometric attribute of the damage feature is based on a radius of the plurality of rolling elements, a depth of the damage feature, a radius of the outer race of the rolling-element bearing, the number of rolling elements in the plurality of rolling elements, or a combination thereof.

3. The method of claim 2, wherein the length of the damage feature is calculated as $2\sqrt{2rp-p^2}$, where r is the radius of the plurality of rolling elements and p is a depth of the damage feature.

4. The method of claim 2, wherein the length of the damage feature is calculated as $\pi r/3$, where r is the radius of the plurality of rolling elements.

5. The method of claim 2, wherein the length of the damage feature is calculated as $$2\left(\frac{\pi R}{N}+r\right),$$

where r is the radius of the plurality of rolling elements, R is the radius of the outer race, and N is the number of rolling elements in the plurality of rolling elements.

6. The method of claim 2, further comprising:
   calculating a second length of the damage feature on the rolling-element bearing based on the geometry of the rolling-element bearing;
   determining the accumulated mass of damage particles ejected from the rolling-element bearing during operation of the rolling-element bearing; and
   generating a second indication when the accumulated mass of the damage particles exceeds a second predetermined threshold, wherein the second predetermined threshold of the accumulated mass is based on the second length of the damage feature.

7. The method of claim 6, further comprising:
   calculating a third length of the damage feature on the rolling-element bearing based on the geometry of the rolling-element bearing;
   determining the accumulated mass of damage particles ejected from the rolling-element bearing during operation of the rolling-element bearing; and
   generating a third indication when the accumulated mass of the damage particles exceeds a third predetermined threshold, wherein the third predetermined threshold of the accumulated mass is based on the third length of the damage feature.

8. The method of claim 7, wherein the second length of the damage feature corresponds to approximately ⅙ of a circumference of the plurality of rolling elements, and the third length of the damage feature corresponds to a length of the damage feature large enough to include two of the plurality of rolling elements.

9. A method for estimating wear damage of a rolling-element bearing comprising an inner race, an outer race, and a plurality of rolling elements between the inner and outer races, the method comprising:
   calculating, using a processor, a first length of a spall cavity on the rolling-element bearing based on a geometry of the rolling-element bearing, the first length corresponding to a first relationship between the spall cavity and the plurality of rolling elements;
   calculating, using a processor, a second length of the spall cavity on the rolling-element bearing based on the geometry of the rolling-element bearing, the second length corresponding to a second relationship between the spall cavity and the plurality of rolling elements;

determining, using a processor, an accumulated mass of spall particles ejected from the rolling-element bearing during operation of the rolling-element bearing;

generating, using a processor, a first indication when the accumulated mass of the spall particles exceeds a first predetermined threshold, the first predetermined threshold being based on the first length of the spall cavity; and generating, using a processor, a second indication when the accumulated mass of the spall particles exceeds a second predetermined threshold, the second predetermined threshold being based on the second length of the spall cavity.

10. The method of claim 9, wherein the first and second lengths of the spall cavity are measured along an inner circumference of the outer race of the rolling-element bearing.

11. The method of claim 10, wherein one of the first and second lengths of the spall cavity is calculated as $2\sqrt{2rp-p^2}$, where r is a radius of the plurality of rolling elements and p is a depth of the spall cavity.

12. The method of claim 10, wherein one of the first and second lengths of the spall cavity is calculated as $\pi r/3$, where r is the radius of the plurality of rolling elements.

13. The method of claim 10, wherein one of the first and second lengths of the spall cavity is calculated as $$2\left(\frac{\pi R}{N}+r\right),$$

where r is the radius of the plurality of rolling elements, R is the radius of the outer race, and N is the number of rolling elements in the plurality of rolling elements.

14. A system for estimating wear damage of a rolling-element bearing comprising:

a debris sensor configured to generate a debris signal representative of a size of debris particles passing through a fluid passageway; and a computing system in operable communication with the debris sensor, the computing system being configured to:

determine an accumulated mass of the debris particles passing through the fluid passageway based on the debris signal; and generating an indication when the accumulated mass of the debris particles exceeds a predetermined threshold, wherein the predetermined threshold of the accumulated mass is based on at least one geometric attribute of a damage feature on the rolling-element bearing, and the at least one geometric attribute of the damage feature is based on a geometry of the rolling-element bearing, wherein the generating of the indication is based on a weighting scheme, and the weighting scheme is represented by a function with a first slope corresponding to a predetermined threshold of a first value and a second slope corresponding to a predetermined threshold with a second value, the first value of the predetermined threshold being less than the second value of the predetermined threshold and the first slope being greater than the second slope, and the at least one geometric attribute of the damage feature may be expressed according to at least one of:

$2\sqrt{2rp-p^2}$, where r is the radius of the plurality of rolling elements and p is a depth of the damage feature, $\pi r/3$, where r is the radius of the plurality of rolling elements, and $$2\left(\frac{\pi R}{N}+r\right),$$

where r is the radius of the plurality of rolling elements, R is the radius of the outer race, and N is the number of rolling elements in the plurality of rolling elements.

* * * * *